(12) United States Patent
Lew

(10) Patent No.: US 6,296,021 B1
(45) Date of Patent: Oct. 2, 2001

(54) LEAK REPAIR DEVICE FOR RIGID PIPES

(75) Inventor: Wing G. Lew, Los Angeles, CA (US)

(73) Assignee: Sachwin Products, Inc., Torrance, CA (US)

( * ) Notice: Subject to any disclaimer, the term of this patent is extended or adjusted under 35 U.S.C. 154(b) by 0 days.

(21) Appl. No.: 09/619,844

(22) Filed: Jul. 20, 2000

(51) Int. Cl.[7] .................................................. F16L 55/178
(52) U.S. Cl. .................................................. 138/99; 138/98
(58) Field of Search .................................... 138/99, 98, 97

(56) References Cited

U.S. PATENT DOCUMENTS

| | | | |
|---|---|---|---|
| 2,279,642 | * | 4/1942 | Schreiner ................................. 138/99 |
| 2,520,802 | * | 8/1950 | Hampton ................................. 138/99 |
| 2,529,411 | * | 11/1950 | Northrup ................................. 138/99 |
| 2,581,015 | * | 1/1952 | Graham ................................... 138/99 |
| 5,199,464 | * | 4/1993 | Savard .................................... 138/99 |
| 5,247,967 | * | 9/1993 | Bourque ................................. 138/99 |
| 5,388,617 | * | 2/1995 | Sasaki et al. ........................... 138/99 |
| 5,497,808 | * | 3/1996 | Schlund et al. ......................... 138/99 |
| 5,706,862 | * | 1/1998 | Meinerding, Sr. ...................... 138/99 |

* cited by examiner

*Primary Examiner*—James Hook
(74) *Attorney, Agent, or Firm*—Frederick Gotha

(57) ABSTRACT

A leak repair device composed of an elastomeric seal having an outer toroidal portion radially of a central axis and a continuous membrane portion integral with and peripherally enclosed by the toroidal portion. The elastomeric seal is held by a semi-rigid flexible cover member which has a plurality of parallel slots extending across the surface of the cover member. As the cover member is compressed radially against a rigid pipe, the slots permit the cover member to bend to the contour of the pipe. The toroidal portion of the elastomeric seal is compressed against the pipe to seal the leak and the membrane portion encapsulates the leak region to further seal the escape of fluid through the leak repair device.

16 Claims, 3 Drawing Sheets

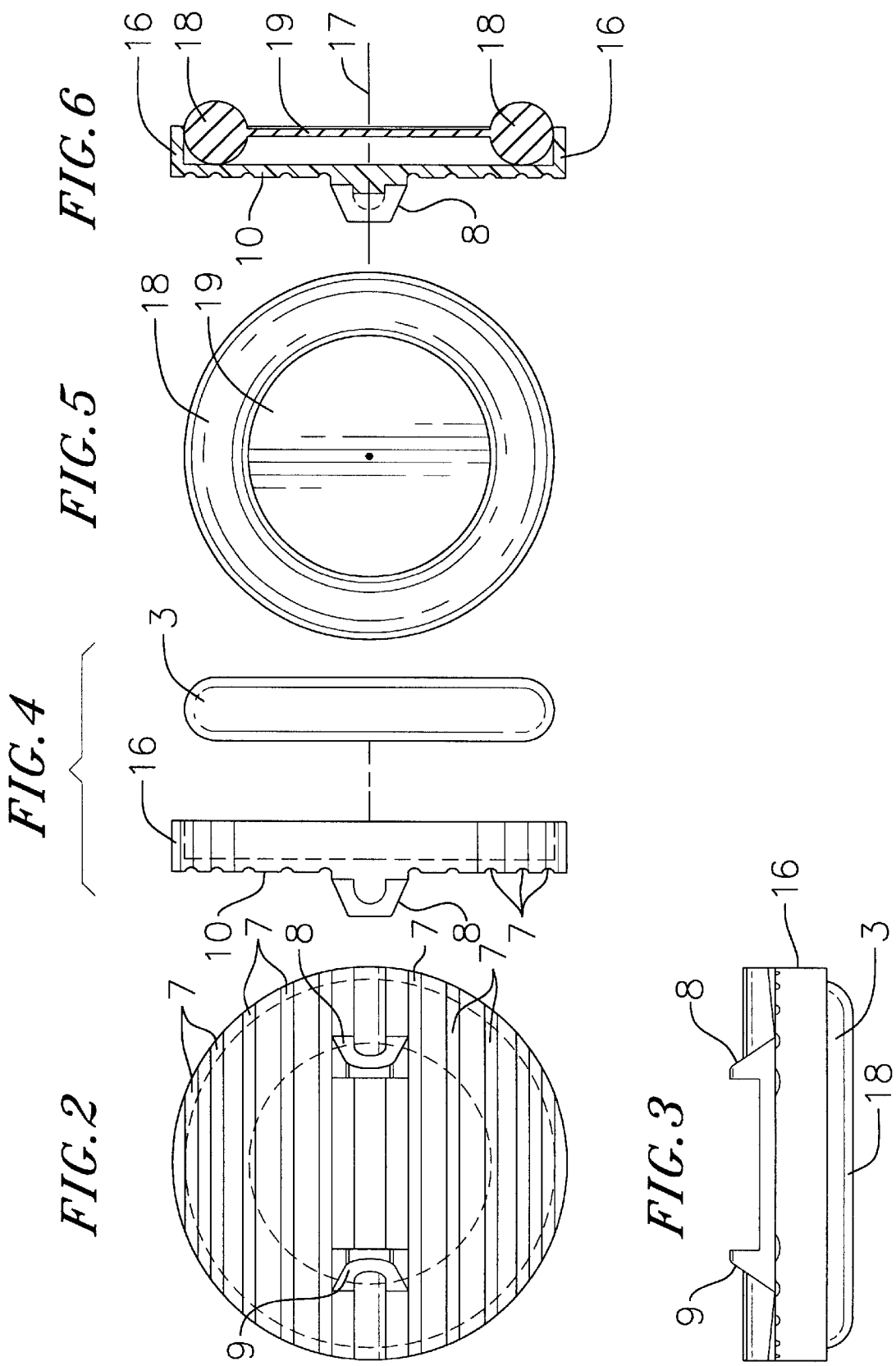

LEAK REPAIR DEVICE FOR RIGID PIPES

FIELD OF THE INVENTION

This invention relates to a device to temporarily repair fluid leaks in rigid pipes.

BACKGROUND OF THE INVENTION

Fluid leaks in rigid pipes are commonly caused by punctures, blowouts, erosion or tears. A repair in such instances involves a shut down of fluid flow in the damaged pipe segment of the pipeline. To temporarily contain such a leak, it is necessary to shut down fluid flow and seal the area where the leak has occurred quickly to prevent excessive escape of fluid before permanent repair can be made. Rigid pipes for fluid transport may be of many different diameters, and in the prior art, leak repair devices were generally designed for particular pipe diameter sizes and consequently did not have the capability to form a temporary seal for a spectrum of diameters. U.S. Pat. No. 5,497,808 (the '808 patent) describes a leak repair device that utilizes a rigid compression sleeve having an internal lip to captively retain an O-ring made of a resilient material. The rigid compression sleeve described in the '808 patent is limited to use for a narrow spectrum of small pipe diameters and its rigidness consequently limits its practicality. Because the curvature of the rigid compression sleeve is fixed, and the O-ring of fixed diameter, there is a narrow range of pipe diameters which permit the O-ring to be compressed sufficiently against the rigid pipe to stop the loss of fluid. It is therefore desirable to have a semi-rigid, flexible cover member rather than a rigid compression sleeve such that under radial compression the semi-rigid flexible cover will adapt to the curvature of the rigid pipe and thus eliminate the necessity of variously sized rigid compression sleeves and O-rings. In the prior art, the toroidal O-ring having a central void region permitted fluid escape between the compressive sleeve and the O-ring. It is also desirable to have a membrane integral with an O-ring to seal the damaged area of the pipe to form an airtight seal.

SUMMARY OF THE INVENTION

There is, therefore, provided according to the present invention, a single leak repair device adaptable for repairing fluid leaks for a variety of diameters of rigid pipes.

The present invention is directed to an elastomeric seal member held by a semi-rigid flexible cover member such that the flexible cover member under sufficient compression will adapt to the curvature of the rigid pipe and compress the elastomeric seal member against the rigid pipe to seal a leak. In the preferred embodiment of this invention, a single leak repair device may be used to repair leaks in rigid pipe from one-half inch to twelve inch diameter pipes. The elastomeric seal member has an outer toroidal portion radially of a central axis and a continuous membrane portion integral with and peripherally enclosed by the toroidal outer portion. The central axis is concentric with the center of the toroidal portion and orthogonal to the membrane in the preferred embodiment. A semi-rigid, flexible cover member preferably made of a plastic material has a plurality of parallel slots that extend laterally across the surface of the cover member defining segments between the slots. Upon radial compression of the cover member against a rigid pipe, the segments adjoining the slots remain rigid but are permitted to move relative to each other at the adjoining slots to conform to the contour of the rigid pipe. A peripheral skirt extends axially from the surface of the cover member and is so dimensioned that the toroidal portion of the elastomeric seal is placed into bearing engagement with the skirt of the cover member and is restrained from radially expanding when the seal is under axial compression. To seal a fluid leak in a rigid pipe, the toroidal portion of the elastomeric seal is placed into bearing engagement with the skirt of the cover member and then placed over the area of the leak to radially enclose it. A clamp member associated with the semi-rigid flexible cover member is adapted for placement around the pipe and flexible cover member such that the flexible cover member will be placed in compression against the pipe as the clamp member is tightened. When the clamp member is sufficiently tightened, the outer toroidal portion of the elastomeric seal will be axially compressed against the pipe to form a seal against the pipe while the integral membrane portion of the elastomeric seal encapsulates the leak region and thus further seals and contains the escape of fluid through the leak repair device.

BRIEF DESCRIPTION OF THE DRAWINGS

These and other features and advantages will become appreciated as the same become better understood with reference to the following specification, claims and drawings wherein:

FIG. 2 is a top view of the flexible cover member of this invention holding the elastomeric seal.

FIG. 3 is a front view of FIG. 2.

FIG. 4 is a side of FIG. 2 illustrating the elastomeric seal removed.

FIG. 5 is a front view of the elastomeric seal.

FIG. 6 is a cross-sectional view of the repair device of this invention shown in FIG. 1.

DETAILED DESCRIPTION

Figure 1:
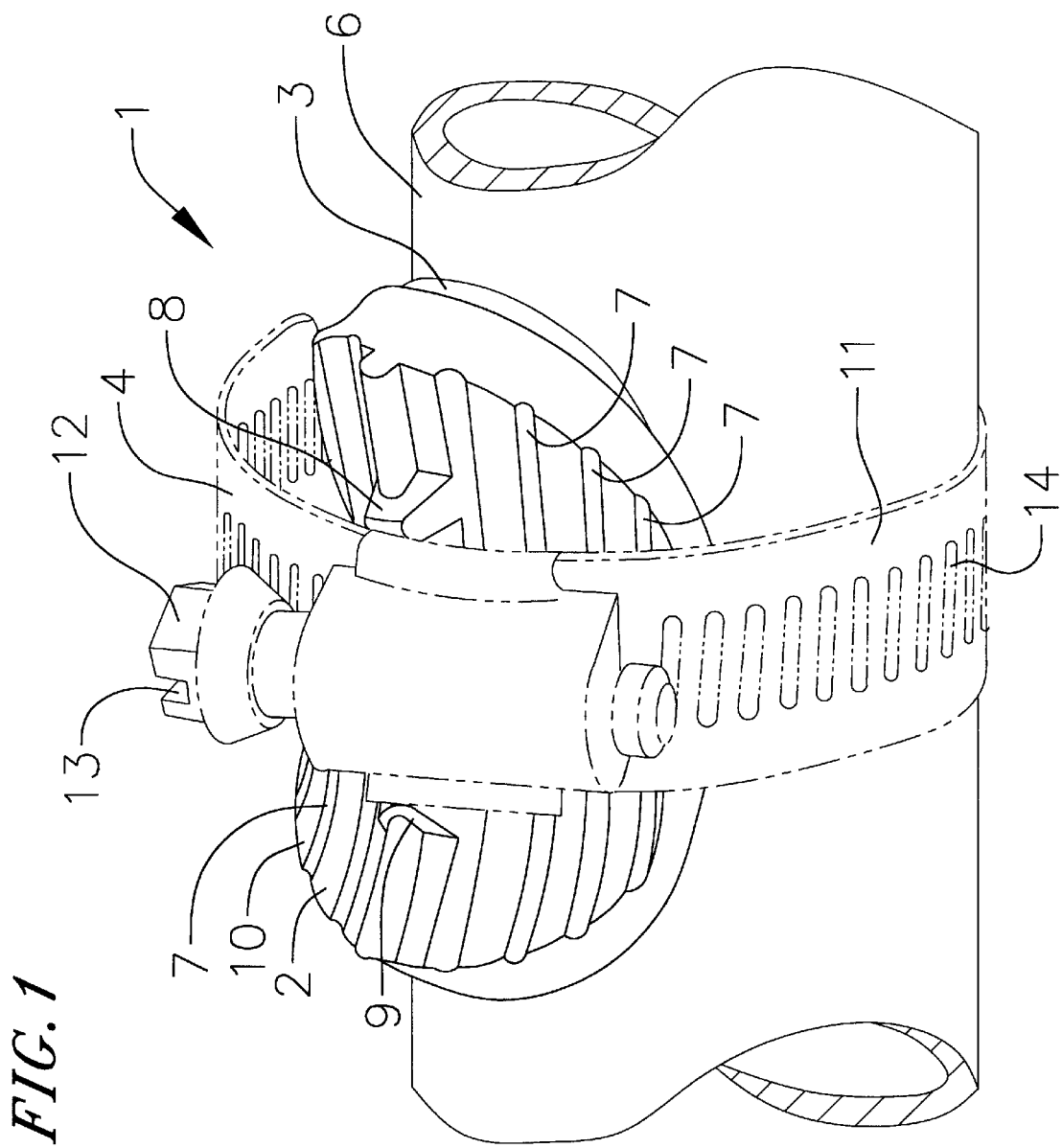
FIG. 1 is a perspective view of the leak repair device of this invention illustrated in clamped relationship with a rigid pipe to form a seal.

FIG. 1 is a perspective view of the assembly of the components of leak repair device 1 of this invention compressively clamped against rigid pipe 6. As can be seen in FIG. 1, the components of leak repair device 1 of this invention include a semi-rigid flexible cover member which captively holds the elastomeric seal member 3 when both the flexible cover member 2 and elastomeric seal 3 are placed in compression by tightening clamp member 4 against the rigid pipe 6. The flexible cover member and elastomeric seal of leak repair device 1 are so constructed and designed so as to permit the repair of punctures, blowouts or corrosive leaks that may occur in the universe of rigid pipes varying from one-half inch to twelve inches in diameter. The rigid pipes may be made from materials well known in the prior art that include plastic, copper, stainless or galvanized pipe. Flexible cover member 2, as can be seen in FIG. 1, has a multiplicity of slots 7 extending substantially parallel to each other across its upper surface 10 which permits the flexible cover member to bend and conform to, when placed under radial compression, the contour of rigid pipe 6. In FIG. 2, which is a top view of semi-rigid flexible cover member 2, the multiplicity of parallel slots 7 in upper surface 10 of the cover member are shown with segments 15 adjoining the slots 7. Under radial compression, segments 15 remain rigid while bending occurs at the slots.

By referring to FIGS. 3 and 4, alignment locators 8 and 9 can be seen extending from the outer surface 10 of the flexible cover member 2 and provide a fixed guide to position hose portion 11 of clamp member 4. Although not shown in the drawings, clamp member 4 in one embodiment may utilize a worm gear and in another embodiment, a ratchet means to tighten hose portion 11. As shown in FIG. 1, the hose portion may be tightened about the rigid pipe by inserting a rotary driver into slot 13 to drive either a worm gear or other ratchet device. By rotating worm gear 12 (not shown) in one embodiment, the clamp member may be tightened as the worm gear 12 engages the multiplicity of ratchet slots 14 in hose portion 11 of clamp member 4. Thus, to place semi-rigid, flexible cover member 2 into radial compression, the hose portion 11 of the clamp member 4 is guided around both rigid pipe 6 and cover member 2 by placing the hose portion between alignment locators 8 and 9. This also assures that parallel slots 7 are substantially parallel to the longitudinal axis of the rigid pipe.

Elastomeric seal 3 is illustrated in FIGS. 3, 4, 5 and 6 and as can be seen in FIG. 3, elastomeric seal 3 is held within cover member 2 by axially extending skirt 16 which extends axially and substantially orthogonally from outer surface 10 of cover member 2 and forms a continuous perimeter wall to captively contain elastomeric seal 3. Elastomeric seal 3 has a central axis 17 and an outer toroidal portion 18 which radially surrounds and is integrally formed with membrane portion 19. It can be seen that membrane portion 19 has a substantially smaller thickness than the diameter of outer toroidal portion 18. A cross section of elastomeric seal 3 is shown in FIG. 6. Elastomeric seal 3 is so dimensioned and constructed that the toroidal outer portion 18 creates a seal around the damaged portion of the rigid pipe when sufficient compression is applied by clamp member 4 to cover member 2 as the clamp member is tightened around the rigid pipe. As cover member 2 bends at slots 7 under radial compression, toroidal outer portion 18 is restrained by skirt 16 from laterally expanding and thus forms a tight seal around the damaged area of the pipe. Membrane portion 19 assures that the leak is confined within the toroidal portion of the elastomeric seal and that the damaged portion of the pipe is encapsulated under the membrane portion thereby preventing any leakage past semi-rigid, flexible cover member 2.

Figure 7:
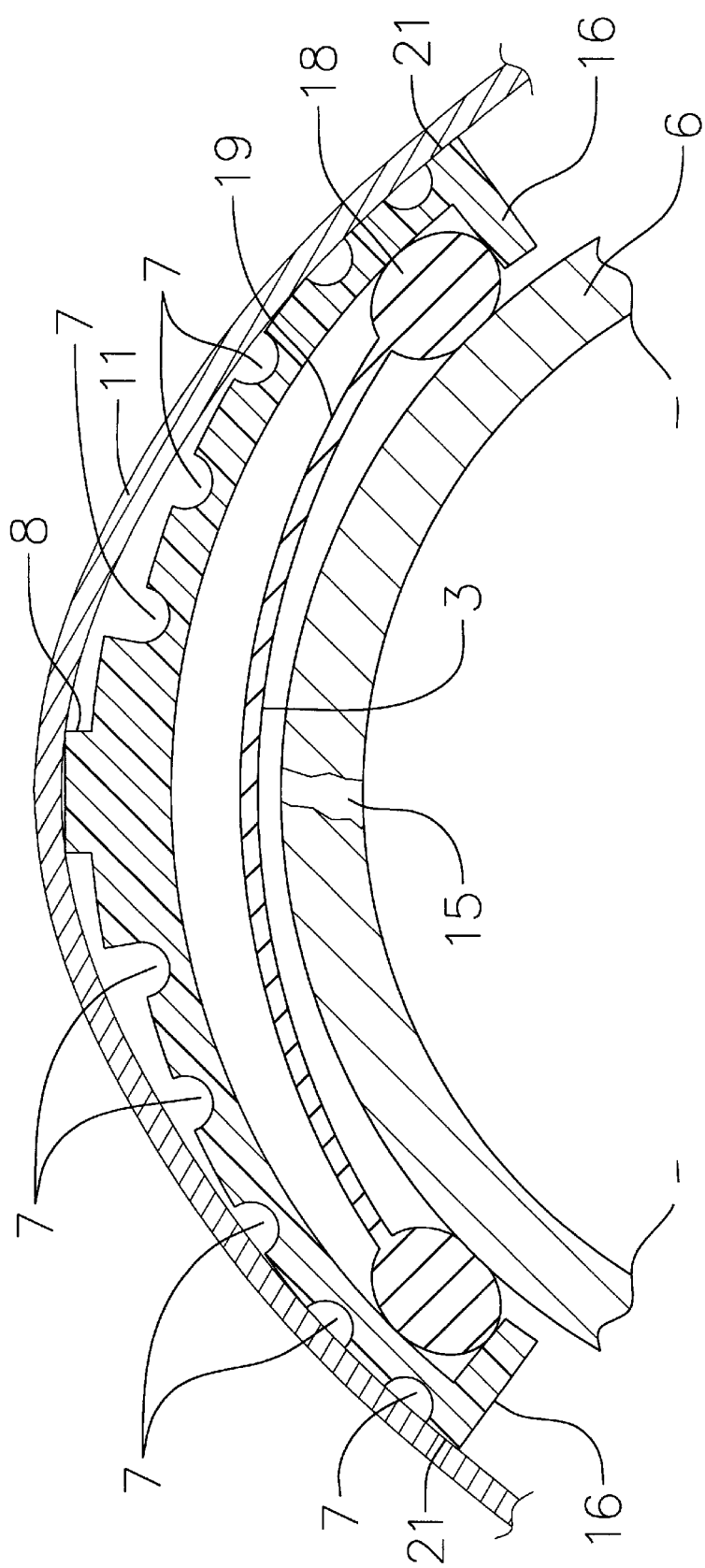
FIG. 7. is a cross-sectional view of the repair device of FIG. 1. deployed in a clamped relationship with a rigid pipe to form a seal.

By reference to FIG. 1 and FIG. 7, the operation of the leak repair device can be more readily described. After clamp member 4 is sufficiently tightened, outer toroidal portion 18 will be in bearing compression against skirt 16 as a result of the radial compression placed upon elastomeric seal 3 by cover member 2. The plurality of slots 7 in the upper surface of the semi-rigid, flexible cover member 2 permit the cover member to bend at the various slots as radial compression is exerted against the cover member at the peripheral region 21 of upper surface 10 of cover member 2. This permits the cover member 2 to conform to various curvatures of rigid pipe and eliminates the necessity of having variously sized cover members and consequently eliminates the need of a multiplicity of different sizes of rigid compression sleeves disclosed in the prior art depending upon pipe diameter. The cover member of this invention is preferably made of a plastic material that has semi-rigid qualities which permit the cover member to bend at slots 7 to form the necessary contour as the hose portion 11 of clamp member 4 radially compresses cover member 2 at its outer peripheral region 21.

While I have shown and described embodiments of a leak repair device for rigid pipes, it is to be understood that the invention is subject to many modifications without departing from the scope and spirit of the claims as recited herein.

What is claimed is:
1. A leak repair device for rigid pipes comprising:
    (a) an elastomeric seal member having a central axis and a radial toroidal outer portion;
    (b) a semi-rigid flexible cover member having a peripheral skirt for holding said elastomeric seal member where said semi-rigid flexible cover member is so designed and constructed that upon radial compression of said semi-rigid flexible cover member, said semi-rigid flexible cover member will substantially conform to the curvature of said rigid pipe and where said elastomeric seal member is restrained from lateral displacement by said peripheral skirt during axial compression of said radial toroidal outer portion;
    (c) a clamp member associated with said semi-rigid flexible cover member for radially compressing said semi-rigid flexible cover member relative to said rigid pipe thereby axially compressing said radial toroidal outer portion against said rigid pipe to form a seal.
2. The leak repair device of claim 1 where said semi-rigid flexible cover member has an outer surface, said outer surface having a plurality of substantially parallel slots extending laterally in said surface.
3. The leak repair device of claim 2 where said peripheral skirt extends axially from said outer surface.
4. The leak repair device of claim 3 where said semi-rigid flexible cover member is made of a plastic material.
5. The leak repair device of claim 1 where said elastomeric seal member further comprises a continuous membrane portion integral with said toroidal outer portion and surrounded by said toroidal outer portion where said membrane portion has an axial dimension less than the axial dimension of said toroidal outer portion.
6. The leak repair device of claim 5 where said semi-rigid flexible cover member has an outer surface, said outer surface having a plurality of substantially parallel slots extending laterally in said surface.
7. The leak repair device of claim 6 where said peripheral skirt extends axially from said outer surface.
8. The leak repair device of claim 7 where said semi-rigid flexible cover member is made of a plastic material.
9. In combination:
    (a) a rigid pipe;
    (b) an elastomeric seal member having a central axis, and a radial toroidal outer portion;
    (c) a semi-rigid flexible cover member having a peripheral skirt for holding said elastomeric seal member where said semi-rigid flexible cover member is so designed and constructed that upon radial compression of said semi-rigid flexible cover member, said semi-rigid flexible cover member will substantially conform to the curvature of said rigid pipe and where said elastomeric seal member is restrained from lateral displacement by said peripheral skirt during axial compression of said radial toroidal outer portion; and
    (d) a clamp member associated with said semi-rigid flexible cover member for radially compressing said semi-rigid flexible cover member relative to said rigid pipe thereby axially compressing said radial toroidal outer portion against said rigid pipe to form a seal.
10. The combination of claim 9 where said semi-rigid flexible cover member has an outer surface, said outer surface having a plurality of substantially parallel slots extending laterally in said surface.

11. The combination of claim 10 where said peripheral skirt extends axially from said outer surface.

12. The combination of claim 11 where said semi-rigid flexible cover member is made of a plastic material.

13. The combination of claim 9 where said elastomeric seal member further comprises a continuous membrane portion integral with said toroidal outer portion and surrounded by said toroidal outer portion where said membrane portion has an axial dimension less than the axial dimension of said toroidal outer portion.

14. The combination of claim 13 where said semi-rigid flexible cover member has an outer surface, said outer surface having a plurality of substantially parallel slots extending laterally in said surface.

15. The combination of claim 14 where said peripheral skirt extends axially from said outer surface.

16. The combination of claim 15 where said semi-rigid flexible member is made of a plastic material.

\* \* \* \* \*